United States Patent [19]

Noah et al.

[11] Patent Number: 5,772,887
[45] Date of Patent: Jun. 30, 1998

[54] MODULAR BIOREACTOR FOR THE REMEDIATION OF LIQUID STREAMS AND METHODS FOR USING THE SAME

[75] Inventors: Karl S. Noah; Raymond L. Sayer; David N. Thompson, all of Idaho Falls, Id.

[73] Assignee: Lockheed Martin Idaho Technologies Company, Idaho Falls, Id.

[21] Appl. No.: 827,244

[22] Filed: Mar. 28, 1997

[51] Int. Cl.⁶ .................................................... C02F 3/06
[52] U.S. Cl. .......................... 210/617; 210/150; 210/201
[58] Field of Search .................................... 210/615–618, 210/151, 199, 201, 255, 370

[56] References Cited

U.S. PATENT DOCUMENTS

| | | | |
|---|---|---|---|
| 4,599,174 | 7/1986 | McDowell | 210/615 |
| 4,732,585 | 3/1988 | Lerner | 210/150 |
| 4,818,404 | 4/1989 | McDowell | 210/617 |
| 5,389,247 | 2/1995 | Woodside | 210/151 |
| 5,500,112 | 3/1996 | McDonald | 210/151 |
| 5,609,753 | 3/1997 | Prazmowski | 210/150 |

OTHER PUBLICATIONS

Wildeman, T., et al, "Design Configurations," *Wetland Design for Mining Operations*, BiTech Publishers Ltd., Richmond, B.C. Canada 1993, pp. 13–1 thru 13–8.

Kalin, M. et al, "Biological Amelioration of Acidic Seepage Streams", Conference Proceedings, Second International Conference on the Abatement of Acidic Drainage, Montreal, Sep. 1991, pp. 355–368.

McIntire, P., et al, "Application of Anaerobic Processes in Constructed Wetlands for the Treatment of Acid Mine Drainage", *Biohydrometallurgy*, 1989 pp. 627–641.

Hendricks, A.C., "The Use of An Artificial Wetland to Treat Acid Mine Drainage", Conference Proceedings, Second International Conference on the Abatement of Acidic Drainage, Montreal, Sep. 1991, pp. 549–558.

Wildeman, T., et al, "Laboratory and Pilot–Scale Studies on the Treatment of Acid Rock Drainage at a Closed Gold–Mining Operation in California", Bureau of Mines Special Publication SP 06B–94, International Land Reclamation and Mine Drainage Conference and third International Conference on the Abatement of Acidic Drainage, vol. 2, pp. 379–386.

Dvorak, D.H., et al, "Treatment of Metal–Contaminated Water Using Bacterial Sulfate Reduction: Results from Pilot–Scale Reactors", Conference Proceedings, vol. 1, Second International Conference on the Abatement of Acidic Drainage, Montreal, Sep. 1991, pp. 301–314.

*Primary Examiner*—Thomas G. Wyse
*Attorney, Agent, or Firm*—Workman Nydegger & Seeley

[57] ABSTRACT

The present invention is directed to a bioreactor system for the remediation of contaminated liquid streams. The bioreactor system is composed of at least one and often a series of sub-units referred to as bioreactor modules. The modular nature of the system allows bioreactor systems be subdivided into smaller units and transported to waste sites where they are combined to form bioreactor systems of any size. The bioreactor modules further comprises reactor fill materials in the bioreactor module that remove the contaminants from the contaminated stream. To ensure that the stream thoroughly contacts the reactor fill materials, each bioreactor module comprises means for directing the flow of the stream in a vertical direction and means for directing the flow of the stream in a horizontal direction. In a preferred embodiment, the reactor fill comprises a sulfate reducing bacteria which is particularly useful for precipitating metals from acid mine streams.

20 Claims, 3 Drawing Sheets

MODULAR BIOREACTOR FOR THE REMEDIATION OF LIQUID STREAMS AND METHODS FOR USING THE SAME

CONTRACTUAL ORIGIN OF THE INVENTION

The United States Government has rights in this invention pursuant to contract number DE-AC07-94ID13223 between the U.S. Department of Energy and Lockheed Martin Idaho Technologies Company.

BACKGROUND OF THE INVENTION

1. Field of Invention

The present invention is directed to a modular bioreactor system for the remediation of liquid streams and methods for using the same.

2. Relevant Technology

Bioremediation of contaminated liquid streams is a preferred solution to the removal of low value and/or of low concentration contaminants, such as toxic heavy metals, from streams. Historically, bioremediation of heavy metal or nitrate contaminated streams has been accomplished by using either a constructed wetland catch basin or a passive bioreactor. Constructed wetlands are typically man-made, engineered, marsh-like areas which are designed, constructed and operated to treat waste water by attempting to optimize physical, chemical, and biological processes of natural ecosystems. These wetlands are formed at the site of the contaminated stream and contain bioreactive materials which chemically react with the contaminants causing the contaminants to physically precipitate out of the stream in a non-toxic form. Constructed wetlands have proven effective in remediating contaminated streams and provide a natural, aesthetically pleasing appearance, which is usually not visibly different from its surroundings.

The problem with constructed wetlands is that they require large areas of land and are expensive to build. In many instances, such as western mine sites located in remote areas with rugged topography, significant amounts of usable land are not available. Even when sufficient amounts of land are available, acquisition of such large areas of land is often extremely expensive. In addition, the construction of wetlands for remediation purposes requires extensive excavation of large areas followed by the addition of remediating materials, such as bioreactive materials. Moreover, after the bioreactive materials in the wetlands are used up, the spent materials deposited on the bottom of the wetlands must be removed and either disposed of in a landfill or recovered. Subsequently, to again be useful, the bioreactive materials in the wetlands must be replaced. Removal of the spent materials and reconstitution of the wetlands generally requires excavation of the entire wetlands area. Therefore, even if enough land is available for a constructed wetland, the construction and maintenance of wetlands can be often unreasonably expensive.

Although passive bioreactors must be built with topography in mind, passive bioreactors require much less land area than constructed wetlands. Generally, passive bioreactors are either stacked in a plate-like configuration or positioned in a series of welded or fiberglass tanks, both of which are typically buried in the ground.

Stacked plate-like bioreactors usually consist of a concrete water tank with several stacked plates or levels resembling an automobile parking garage inside. Bioreactive materials, such as a sulfate reducing bacteria, are placed on the stacked plates so that the contaminated stream contacts the bioreactive materials as the stream flows vertically down the plates. Since stacked passive bioreactors are usually buried and the plates inside are generally placed close together, removal of spent bioreactive material and installation of fresh bioreactive material often requires extraordinary procedures that render this stacked configuration impractical.

Passive bioreactors comprising a series of tanks are generally easier to maintain than the stacked plate-like bioreactors. Maintenance of the series of tanks is still, however, laborious, i.e., two men with a shovel. The primary problem with passive bioreactors having tanks in a series is the lack of contact between the contaminated stream and the bioreactive materials. The series of tanks tend to channel the liquid stream through the tanks in a horizontal manner with little, if any, side to side or vertical movement. This results in incomplete remediation of the stream passing through the bioreactor system.

A further drawback shared by constructed wetlands, stacked passive bioreactors and passive bioreactors in series is their lack of adaptability. For example, the wetlands and passive bioreactors presently used are built on-site, i.e., the location of the contaminated stream. As mentioned above, construction of both wetlands and passive bioreactors is expensive. Once built, these remediation systems are permanent and cannot be moved or easily modified. Therefore, these remediation systems are built on-site, loaded on-site, reconstituted on-site and in the event of changing circumstances, require extensive modification on-site.

In view of the drawbacks of the presently used remediation systems, it is readily apparent that there exists a need for an effective remediation system and method of remediation that is affordable, easy to maintain, adaptable, maximizes contact between the reactor fill and the stream, and requires a less significant amount of land.

SUMMARY AND OBJECTS OF THE INVENTION

It is, therefore, an object of the present invention to provide a bioreactor system for the remediation of contaminated liquid streams that is less expensive than remediation systems heretofore used.

It is another object of the present invention to provide bioremediation system that is easily constructed on a less significant amount of land.

It is a further object of the present invention to provide a bioreactor system that allows for easy removal and disposal of spent bioreactive material, and easy reconstitution of the reactor biosystem.

Still further, an object of the present invention is to provide a bioreactor system that provides maximum contact between the contaminated stream and the bioreactive materials in the bioreactor system. Maximum contact between the bioreactive materials and the contaminated stream allows the bioreactor system to optimize the quantity of contaminants removed from the stream in a minimum amount of space.

Furthermore, it is an object of the present invention to provide a bioreactor system that is adaptable to specific waste sites. For instance, a mobile bioreactor system is capable of being transported to a contaminated stream and once remediation is complete, the bioreactor system can be moved and reused at another waste site. In addition, an adaptable bioreactor system is capable of being constructed to meet the specific needs of a contaminated stream and is also capable of being modified to meet the changing needs of a contaminated stream.

To achieve the foregoing objects, and in accordance with the invention as embodied and broadly described herein, the present invention is directed to a bioreactor system composed of at least one and often a series of sub-units referred to as bioreactor modules.

In accord with the present invention, and contrary to conventional knowledge, it has been discovered that bioreactor systems formed from modular sub-units provide an inexpensive, reusable system for remediating contaminated streams. The modularity allows the bioreactor system to be broken into numerous sub-units referred to as bioreactor modules. The bioreactor modules are small enough to be transported from waste site to waste site and be easily installed and removed. The bioreactor modules are preferably large enough to allow a front-end loader to easily remove and replace bioreactive materials. The modular design also allows for the correct number of bioreactor modules to be placed at the waste site for a specific use, as well as allowing for the modification of a bioreactor system upon changing circumstances.

Each of the bioreactor modules in the bioreactor system contains reactor fill materials which function to remove the contaminants from the stream. The reactor fill materials comprise at least one bioreactive material that removes the contaminants from the stream. For instance, in one embodiment, reactor fill may comprise three layers: a sawdust layer as the top layer; a sulfate reducing bacteria layer as the middle layer; and a gravel base layer as the bottom layer. Maximum contact between the stream and the reactor fill materials is accomplished by means for directing the flow of the stream in a vertical manner and means for directing the stream in a horizontal manner. To allow easy maintenance, these means are preferably removable so as to allow a front end loader to enter each module. Means for connecting the bioreactor modules together is located on the outer portion of the bioreactor modules. Tailored bioreactor systems that maximize contact between the contaminated stream and the reactor fill use minimum amounts of land area.

In a preferred embodiment of the present invention, the modular bioreactor system comprises at least one bioreactor module having a U-shaped open trough design for easy maintenance. The reactor fill material in the bioreactor module comprises a bioreactive sulfate reducing bacteria material to remove contaminants from the stream. The flow of the contaminated stream through the bioreactor module is directed horizontally through the module with a plurality of baffles arranged in the inner portion of the module in an alternating manner. The flow of the stream is directed vertically through the reactor fill layers using a weir system in the inner portion of the bioreactor module. To form bioreactor systems comprising a plurality of bioreactor modules, the bioreactor modules are connected together using a sealable notch system on each of the modules.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
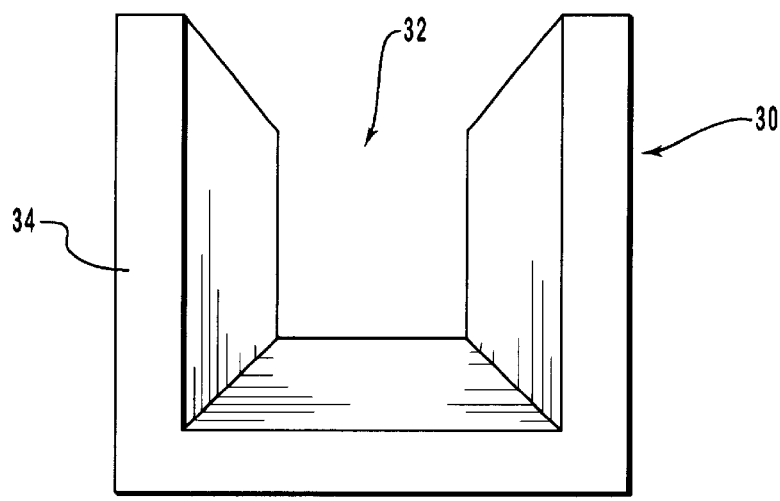
FIG. 1 is an elevational view of a bioreactor module illustrating an open trough design.

The present invention is directed to a modular bioreactor system used to remove contaminants from liquid streams. The invention is further directed to methods for removing contaminants from liquid streams.

Currently, remediation of contaminated streams is accomplished using either constructed wetlands or passive bioreactors. Constructed wetlands are typically man-made, marsh-like areas formed at the site of the contaminated stream. Although constructed wetlands provide an effective, aesthetically pleasing method of remediating contaminated streams, wetlands generally require unreasonable areas of land and are expensive to build.

Passive bioreactors provide a less expensive alternative of remediation that does not require exorbitant amounts of land. Generally, there are two types of passive bioreactors: i) stacked passive bioreactors, having a plate-like configuration inside, resembling an automobile parking garage; and ii) series passive bioreactors which typically comprise a series of welded or fiberglass tanks. Both of these types of passive bioreactors are usually buried in the ground.

The one disadvantage of stacked bioreactors is that maintenance of the plate-like structure makes these types of bioreactors impractical. Furthermore, although tanks in a series are easier to maintain, a contaminated stream passing through the series of tanks is commonly not sufficiently contacted with the bioreactive materials of the reactor fill, resulting in incomplete remediation of the contaminated stream.

The present invention, therefore, provides remediation systems that are affordable, spatially efficient, easy to maintain, adaptable to differing and even changing conditions, transportable and that provide maximum contact between the contaminated stream and the bioreactive materials. In accordance with the present invention, it has been discovered that modular units that can be connected together into a modular remediation system provide a transportable, adaptable, affordable a system that is easy to maintain. For example, because of its modularity, the bioreactor system can be separated into smaller modules that can be easily transported to waste sites. The modularity further allows easy placement and removal of the bioreactor system during installation and removal. Furthermore, the correct number of modular units can be installed for a particular waste stream and if additional reactor units are needed for the bioreactor system to perform its function, additional modules can easily be added.

An additional feature of the present invention is that the bioreactor modules ensure maximum contact between the contaminated stream and the reactor fill by directing the flow of the liquid stream through the modular system in both a horizontal and a vertical manner. Directing the flow of the stream through the modular system maximizes the contact between the stream and the surface area of the reactor fill. By optimizing the use of space in the bioreactor system, the area necessary for the bioreactor system is minimized. Hence, because the modular bioreactor system can be tailored for each specific waste stream and the contact between the contaminated stream and the reactive fill materials is maximized, the area of land necessary for remediation is significantly less than previously used remediation methods.

As used herein, the term "contaminated liquid stream" refers to any stream of liquid, typically water, having foreign matter or contaminant therein. Common contaminants include: acidic metal-bearing streams, such as acid mine drainage; agricultural runoff; liquid effluent or runoff from animal farms, such as cattle, chickens or hogs; or any other contaminated stream. In a preferred embodiment, the modular bioreactor system is designed for the abatement of acid mine drainage, where acidic streams containing metals are neutralized and the metals are precipitated. Metals that can be precipitated out of contaminated streams include, but are not limited to Fe, Zn, Ni, Cd, Cu, and Pb. Although reference is made throughout the patent to the remediation of acid mine drainage streams, this reference is simply meant to provide an example of one type of contaminated stream that can be efficiently remediated using the present invention and should not limit the scope of the present invention.

The present invention provides a modular bioreactor system for removing contaminants from a liquid stream that comprises at least one bioreactor module. A bioreactor module is a structure that can be moved from site to site and can be connected to other bioreactor modules to form larger bioreactor systems. The bioreactor module can be any structure that allows liquid to flow therethrough. However, as illustrated in FIG. 1, a bioreactor module is preferably a U-shaped, open trough structure. Open trough bioreactor modules have an inner portion 32 and an outer portion 34 allowing for easy maintenance, i.e., loading and unloading materials from bioreactor modules. The volume of the bioreactor module is designed to meet the requirements of a particular waste site (i.e., the lay of the land, size of the stream, etc.) and can be any size or shape. The bioreactor module is, however, preferably large enough to accommodate a front-end loading vehicle, such as a BOBCAT® or a KUBOTA® front-end loader to provide easy reactor fill loading and unloading. Yet, the bioreactor module is preferably small enough to be transported to remote waste sites, such as remote western mine sites, using a standard transport truck. In a preferred embodiment, the U-shaped reactor module is about 4 feet deep and about 6 feet wide.

Figure 4:
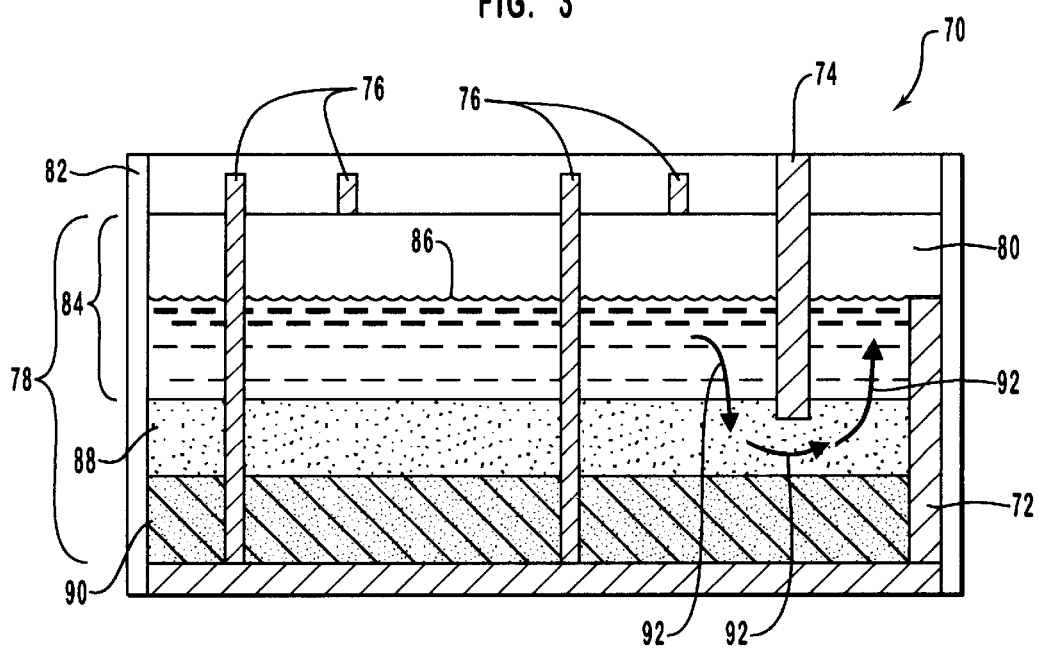
FIG. 4 is a cross-sectional elevational view taken along lines A—A of FIG. 1 view of a bioreactor module unit illustrating the preferred location of the baffles (76), location of the weir (74) in relation to the reactor fill and demonstrates the vertical flow of the liquid stream (92) through the weir system.

The bioreactor module, as illustrated in FIG. 4, comprises a reactor fill 78 located in the inner portion of the U-shaped structure. The reactor fill comprises the active materials in the bioreactor system that remove the contaminants from the contaminated liquid stream. The reactor fill comprises a bioactive material such as a sulfate reducing bacteria, for removing contaminants from the liquid stream. When the bioreactor module is used for applications other than the remediation of acidic mine drainage, other bioreacted materials, such as nitrate reducing bacteria, can be used to remove contaminants from a stream. Sulfate reducing bacteria are especially useful for removing contaminant metals from coal and metal-mine drainage. Under anaerobic conditions, sulfate reducing bacteria oxidize simple organic compounds with sulfate, thereby generating hydrogen sulfide and bicarbonate ions:

$$SO_4^{-2}+2 \text{ lactate} \rightarrow 2 \text{ acetate}+H_2S+2HCO^-_3$$

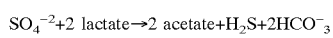

Hydrogen sulfide consequently reacts with contaminant metals to form insoluble metal sulfides:

$$H_2S(g)+M^{+2} \rightarrow MS(s)+2H^+$$

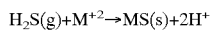

where M includes, but is not limited to, metals such as Fe, Zn, Ni, Cd, Cu, and Pb. Bicarbonate ions can then consume the protons to raise the pH of the acidic water. This is important because a low pH inhibits sulfate-reducing bacteria and increases the solubility of the metal sulfides. The use of sulfate reducing bacteria is more comprehensively disclosed in the following references which are herein incorporated by reference: Dvorak, D. H., et al., *Treatment of Metal-Contaminated Water Using Bacterial Sulfate Reduction: Results From Pilot-Scale Reactors*, pp. 301–314, U.S. Bureau of Mines, Pittsburgh Research Center, Pittsburgh Pa.; Kalin, M. et al., *Biological Amelioration of Acidic Seepage Streams*, pp. 355–368, Boojum Research Limited, 468 Queen St. East, Toronto, Ontario Canada; McIntire, P. E. et al., *Application Of Anaerobic Processes In Constructed Wetlands For The Treatment Of Acid Mine Drainage*, pp. 627–641, Biohydrometallurgy, U.S. Bureau of Mines Pittsburgh Research Center, Pittsburgh, Pa., 1989; A. C. Hendricks, *The Use Of An Artificial Wetland To Treat Acid Mine Drainage*, pp. 549–558, Biology Dept. Virginia Polytechnic Institute and State University, Blacksbury, Va.; Wildeman, T. et al., 1994. *Laboratory And Pilot-Scale Studies On The Treatment of Acid Rock Drainage At A Closed Gold-Mining Operation In California*, pp. 379–386. In Proceedings of the Apr. 24–29, 1994 annual meeting for both the American Society for Surface Mining and Reclamation and the Canadian Land Reclamation Association, Pittsburgh, Pa. United States Department of the Interior, Bureau of Mines Special Publication SP 06B-94.

In addition to bioactive materials, the reactor fill may also contain other layers. In a preferred embodiment, the reactor fill comprises three layers: i) a sulfate reducing bacteria layer as a bioreactive material, having a top portion and a bottom portion; ii) a sawdust layer on the top portion of the sulfate reducing layer, to provide the organic compounds for remediation necessary when using a sulfate reducing bacteria; and iii) a gravel base layer. Any source of sulfate reducing bacteria, such as manure or water logged soil, can be used in the present invention. However, because of its availability and low cost, mud is the preferred source of sulfate reducing bacteria. When mud is used as the sulfate reducing bacteria, the mud is typically mixed with gravel to improve flow through the mud layer.

Figure 5:
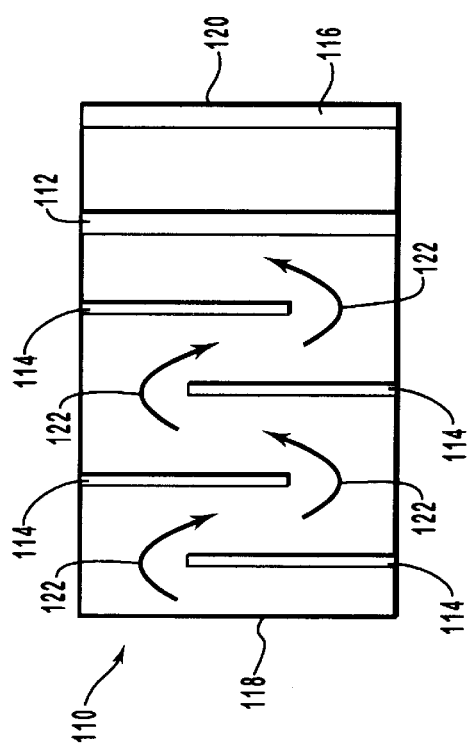
FIG. 5 is a plan view of a bioreactor module unit illustrating the preferred positioning of the baffling (114), the location of the weirs (112, 116), and the horizontal flow of the liquid stream (122) through the bioreactor module.

The bioreactor module further comprises means for directing the liquid stream in a horizontal direction, as illustrated in FIG. 5 (114), and a means for directing the liquid stream in a vertical direction as illustrated in FIG. 4 (72 and 74), both of which are located on the inner portion of the reactor module. As the stream flows from the inlet to the outlet of each bioreactor module, these directing means function to increase the contact of the contaminated stream with the reactor fill. Bioreactor modules are typically arranged at an angle with the inlet end of the bioreactor module being slightly elevated above the outlet so that gravity will cause the liquid stream to slowly travel from the inlet to the outlet.

Any means of directing the flow of the stream in a horizontal direction can be used in the present invention. As illustrated in FIG. 5, a baffle 114 is an example of a means for directing the flow of a stream in a horizontal direction. In a preferred embodiment, a plurality of baffles are positioned in the inner portion of the bioreactor module in such a way as to ensure tourosity of the stream flow path. For example, baffles 114 are preferably arranged in an alternating fashion so that the stream flowing from inlet 118 to outlet 120 is directed along path 122, thereby thoroughly covering the horizontal area of the reactor fill in the bioreactor module.

Figure 3:
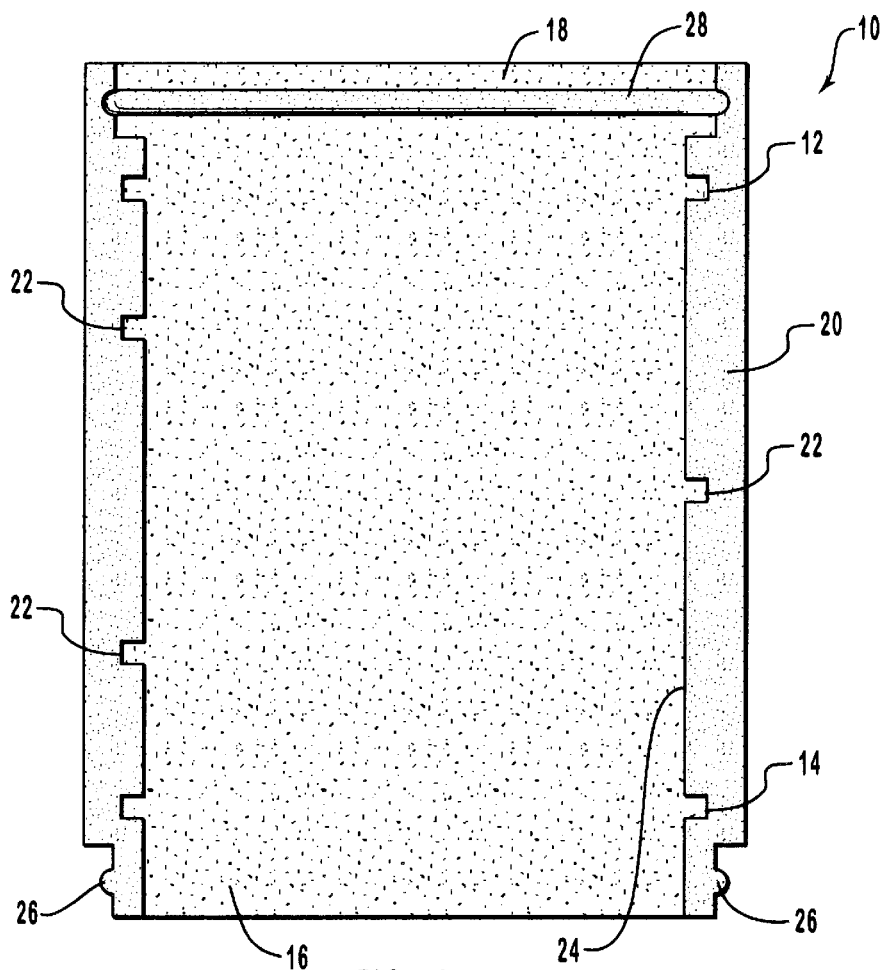
FIG. 3 is a plan view of a bioreactor module unit illustrating slots for the placement of alternating baffles (22) and the weirs (12, 14)

A weir 74, as illustrated in FIG. 4, is an example of a means for directing the flow of the liquid stream in the vertical direction. It should be noted that other means of directing the flow of the stream through the modular unit in the vertical direction are within the scope of the present invention. In a preferred embodiment, weir 74 is positioned on the inner portion of the reactor module to provide a downward flow of the liquid stream through the layers of the reactor fill. Weirs within the scope of the present invention can be located in any manner or at any location within the reactor module that will direct the flow of the stream vertically through the reactor fill layers. For example, FIG. 3 illustrates the placement of two weir slots (12, 14), one being placed at each end of the bioreactor module, whereas FIG. 4 illustrates a weir system having both weirs (72, 74) being placed near the outlet of the bioreactor module.

The use of a vertical directing means is an important advantage of the present bioreactor modules over typical remediation systems which rely only on horizontal flow across the upper surface of the bioreactor fill layers. By directing the flow of the liquid stream downward through the fill layers, the liquid stream contacts all the layers. Furthermore, when the bioactive material in the reactor fill is a sulfate reducing bacteria, it is important that the liquid stream pass through a layer that provides simple organic compounds, such as sawdust, and that reduces the oxygen so that the sulfate reducing bacteria will precipitate the metals from the liquid stream.

The bioreactor module further comprises means for connecting the bioreactor module to other bioreactor modules. As illustrated in FIG. 3, a sealable notch system (26, 28) similar to those used to connect concrete culverts is an example of a connecting means. Each bioreactor module preferably comprises a male notch 26 on one end and a female receptor 28 on the other end. The male notch 26 from one module is connected with the female receptor 28 of another module. A sealant, such as sealing tar, can be placed in the male/female connection to seal the notch and prevent leakage. Sealing notches are generally formed around to the periphery of each end of the bioreactor modules, similar to that in a concrete culvert, to allow joining of the modules.

By connecting one bioreactor module to other bioreactor modules, the bioreactor system can be tailored to the requirements of specific waste sites. In addition, because the individual bioreactor modules can be connected to form bioreactor systems, entire bioreactor systems tailored to the needs of a specific waste site can be transported to the waste site in pieces (i.e., individual bioreactor modules) and connected on-site. Hence, it is often important that the bioreactor modules be small enough to be transported to the waste site where these modules can be easily connected to fit the specific needs of the waste site.

Figure 2:
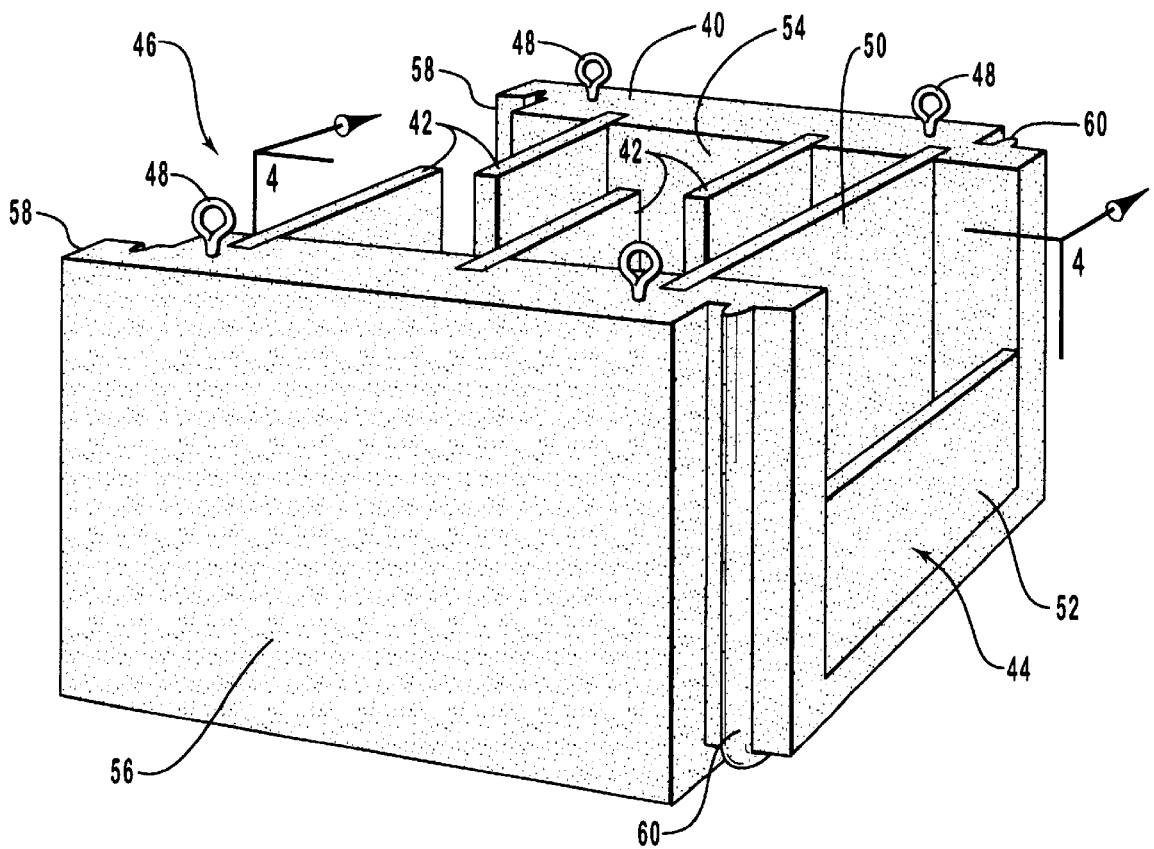
FIG. 2 is a perspective view of an open trough bioreactor module having an alternating baffle arrangement (42) and a pair of weirs (50 and 52)

In a preferred embodiment, the bioreactor module comprises means for transporting the bioreactor module for moving and loading the bioreactor module. Means for transporting can be any means that allows the bioreactor module to be attached to a crane or other means of lifting and moving the bioreactor module. Transporting means aid in the installation and removal of bioreactor modules, as well as the loading and unloading of the bioreactor modules from transport trucks. Cable loops (48) as illustrated in FIG. 2 are an example of transporting means. Preferably, at least one cable loop is located on each end of the modular bioreactor to balance the bioreactor module as it is being lifted and transported into place. In the most preferred embodiment, as illustrated in FIG. 2, two cable loops 48 are located on each end of the bioreactor module. The mobility of the bioreactor modules allows the bioreactor modules to be used numerous time at numerous sites, allows the reactor fill to be either loaded and transported or loaded on-site, and allows the reactor fill to be easily removed from the bioreactor system either on-site, or transported to another location and removed.

A feature of the present invention is that the bioreactor system can be formed from one or more reactor modules, depending on the needs of the waste site. The number of bioreactor modules connected together to form a modular bioreactor system is dependent on a number of factors, such as the length of each individual bioreactor module, the size of the stream and the flow rate of the stream. For example, depending on the size of the bioreactor module, the contaminated stream may require only one bioreactor module to remove the contaminants from the stream. Alternatively, the amount of contaminant in the stream or other factors, may require numerous bioreactor modules connected together to form an adequate modular bioreactor system.

Figure 6:
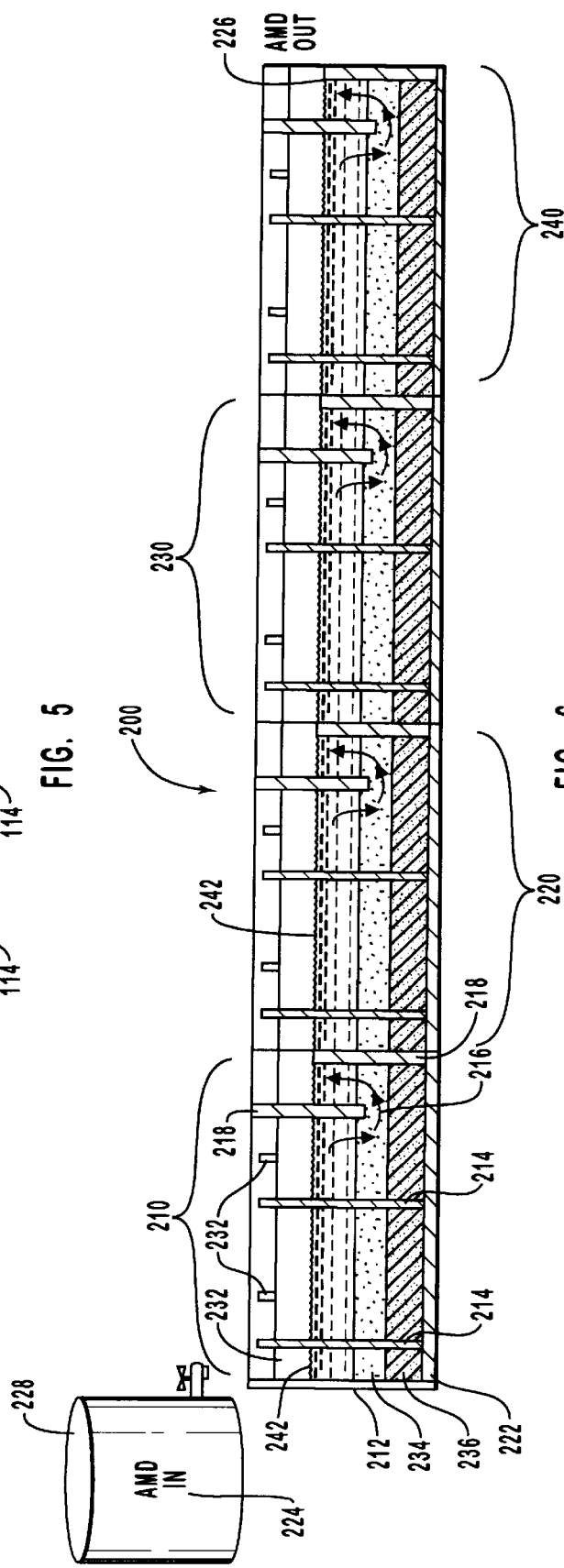
FIG. 6 is an elevational side view of a modular bioreactor system having four bioreactor module units (210, 220, 230, 240) illustrating the reactor fill (212) in the system and the preferred location of the baffles and the preferred positioning of the weirs.

FIG. 6 illustrates a modular bioreactor system 200 comprising four bioreactor modules connected together. Bioreactor system 200 is tilted at a slight angle 222 to allow the contaminated stream to flow down through the bioreactor system. The flow of the contaminated stream into the first bioreactor module is controlled by a means for regulating flow 228 that feeds into inlet 224. A holding tank 228 or a pond may be used as a flow regulating means. Each bioreactor module comprises a reactor fill 212 composed of three layers: i) a top layer 232; ii) a bioactive layer, preferably a sulfate reducing bacteria layer 234; and iii) a base layer, typically gravel 236. In use, the level of the contaminated stream 242 is typically about one half the way up the top layer 232. Alternating baffles 214, function as the means for directing the flow of the stream horizontally through the bioreactor module and weir system 218 functions as means for directing the flow of the stream vertically through the reactor fill layers. The vertical flow causes the stream 216 to pass through all three layers, including the top layer that provides an organic source and also serves to remove oxygen from the stream so that the sulfate reducing bacteria efficiently precipitate the metals from the stream. The stream exits the first bioreactor module over weir 218 which redistributes the stream to the top layer of the module 220 adjoining module 210. The stream enters the second bioreactor module and repeats the process for the removal of contaminates performed in the first bioreactor module 210. Likewise, the same process is continued in the remaining bioreactor modules. It should, however, be noted that each bioreactor may comprise different reactor fill materials. One reason for including differing reactor fills in various bioreactor modules is so that different contaminants can be removed using different reactor fill materials. Therefore, by using different reactor fill materials in different modules, different contaminants can be removed by each module. The stream continues through the modular bioreactor system until the remediated stream exits through outlet 226.

A modular bioreactor system is constructed at the location of the waste site. Depending on the waste site (i.e., lay of the land) a trench may be constructed at the site to accommodate the bioreactor modules. To facilitate flow through the bioreactor module system, the trench or other arrangement is constructed at an angle to allow downhill flow of the contaminated stream. The necessary number of bioreactor modules are transported to the waste site and installed such that the contaminated stream will flow through the bioreactor modules. The baffles, weirs and the reactor fill can be placed into the individual bioreactors either on-site, or prior to being transported to the contaminated site. The baffles are preferably placed in first, followed by the weirs, then by the various reactor fill materials. The bioreactor modules are lifted off the truck and placed one by one into the trench or other arrangement at the waste site. The peripheral sealed notches are filled with a sealant and the bioreactor modules are joined at these notches.

After installation is complete, the contaminated stream is allowed to flow through the modular bioreactor system. As the stream passes through the bioreactor system, its flow is directed by the baffles and the weir system so that the stream contacts all the layers of the reactor fill and the entire horizontal area of the reactor fill. Once the reactor fill materials are spent, the flow of the stream through the bioreactor system is ceased and the reactor fill materials are removed from the bioreactor modules. The bioreactor modules are preferably large enough to accommodate a front end loading vehicle, so removal of the spent reactor fill can be easily accomplished. In addition, the baffles and the weirs are removed from the bioreactor modules prior to removing the reactor fill so as not to interfere with the front-end loading vehicle. If further remediation of the stream is necessary, the bioreactor modules are again loaded with the proper reactor fill materials and the remediation process is again started.

When remediation of the waste site is complete, the bioreactor system is removed from the site by lifting each bioreactor from the trench and loading them on a transport truck. The site can then be returned to its original form. The reactor fill can be removed from the bioreactor modules either at the site prior to moving each module, or after the bioreactor modules have been transported to another site where the reactor fill can be removed and properly disposed. Once the bioreactor modules have been cleaned, the modules may be transported to other sites and reused.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A system for removing contaminants from a liquid stream, said system comprising:

a bioreactor module having an inner portion and an outer portion, the bioreactor module comprising:
 a reactor fill in the inner portion of the bioreactor module for removing contaminants from the liquid stream;
 means for directing the stream in a horizontal direction, the means being in the inner portion of the bioreactor module;
 means for directing the stream in a vertical direction, the vertical directing means being in the inner portion of the bioreactor module; and
 means for connecting the bioreactor module to another bioreactor module.

2. A system for removing contaminants from a stream as recited in claim 1, wherein the reactor fill comprises a bioreactive material.

3. A system for removing contaminants from a stream as recited in claim 2, wherein the bioreactive material is a sulfate reducing bacteria material.

4. A system for removing contaminants from a stream as recited in claim 1, wherein the horizontal directing means comprises at least one baffle.

5. A system for removing contaminants from a stream as recited in claim 1, wherein the vertical directing means comprises at least one weir.

6. A system for removing contaminants from a stream as recited in claim 1, wherein the bioreactor module further comprises a means for transporting the bioreactor module.

7. A system for removing contaminants from a stream as recited in claim 6, wherein the means for transporting the bioreactor module is at least two cable loops located on the outer portion of the bioreactor module.

8. A system for removing contaminants from a stream as recited in claim 1, wherein the bioreactor module is an open trough U-shaped structure.

9. A system for removing contaminants from a stream as recited in claim 1, wherein the system comprises a plurality of bioreactor module units.

10. A system for removing contaminants from a stream as recited in claim 1, wherein the horizontal directing means comprises a plurality of baffles fixed in an alternating manner in the inner portion of the bioreactor module unit.

11. A system for removing contaminants from a stream as recited in claim 1, wherein the bioreactor module is large enough to accommodate a front end loading vehicle.

12. A system for removing contaminants from a stream as recited in claim 1, wherein the horizontal directing means and the vertical directing means are removable.

13. A system for removing contaminants from a stream as recited in claim 1, wherein the connecting means comprises a sealable notch system on the bioreactor module.

14. A system for removing contaminants from a stream as recited in claim 1, further comprising means for regulating the flow of the liquid stream.

15. A system for removing contaminants from a stream as recited in claim 1, wherein the bioreactive material is a sulfate reducing bacteria material having a top portion and a bottom portion, and wherein said reactor fill further comprises an organic material on said top portion of said sulfate reducing bacteria material and a gravel material on the bottom portion of the sulfate reducing bacteria.

16. A method for removing contaminants from a liquid stream, said method comprising the steps of:

providing a modular bioreactor system for removing contaminants from a stream, the bioreactor system comprising at least one bioreactor module unit having an inner portion and an outer portion, the bioreactor module comprising:

a reactor fill in the bioreactor module, the reactor fill having a bioreactor material for removing contaminants from the liquid stream;

means for directing a stream in a horizontal direction, the means being in the inner portion of said reactor module;

means for directing a stream in a vertical direction, the means being in the inner portion of said reactor module; and means for connecting the reactor module to another reactor module, said means on the outer portion of the bioreactor module; and passing a contaminated liquid stream through the bioreactor module system so that the contaminated stream is contacted with the reactor fill to remove contaminants from the stream.

17. A method for removing contaminants from a liquid stream as recited in claim 16, further comprising the step of directing the flow of the stream in a horizontal direction.

18. A method for removing contaminants from a liquid stream as recited in claim 16, further comprising the step of directing the flow of the stream in a vertical direction.

19. A method for removing contaminants from a liquid stream as recited in claim 16, further comprising the step of regulating the flow of the liquid stream through the bioreactor modular system.

20. A bioreactor module for removing contaminants from a liquid stream, the bioreactor module comprising:

an open trough structure having an inner portion and an outer portion;

a reactor fill in the inner portion of the open trough structure, the reactor fill comprising a bioreactive material for removing contaminants from the liquid stream;

means for directing the liquid stream in a horizontal manner through the open trough structure; and means for directing the liquid stream in a vertical manner through the reactor fill.

* * * * *